(12) United States Patent
Sieberer et al.

(10) Patent No.: US 12,712,093 B2
(45) Date of Patent: Aug. 18, 2026

(54) DEVICE FOR CONTROLLING TRAPPED IONS WITH OPTICAL DETECTORS AND LENSES

(71) Applicant: Infineon Technologies Austria AG, Villach (AT)

(72) Inventors: Michael Sieberer, Graz (AT); Yves Colombe, Villach (AT); Clemens Rössler, Villach (AT); Matthias Brandl, Bayern (DE); Klemens Karl Heinrich Schüppert, Goritschach (AT)

(73) Assignee: Infineon Technologies Austria AG, Villach (AT)

( * ) Notice: Subject to any disclaimer, the term of this patent is extended or adjusted under 35 U.S.C. 154(b) by 79 days.

(21) Appl. No.: 18/829,960

(22) Filed: Sep. 10, 2024

(65) Prior Publication Data

US 2025/0087380 A1 Mar. 13, 2025

(30) Foreign Application Priority Data

Sep. 11, 2023 (EP) .................................... 23196624

(51) Int. Cl.
*G21K 1/00* (2026.01)
*G01N 21/64* (2006.01)

(52) U.S. Cl.
CPC ........... *G21K 1/00* (2013.01); *G01N 21/6402* (2013.01)

(58) Field of Classification Search
CPC ............................. G21K 1/00; G01N 21/6402
See application file for complete search history.

(56) References Cited

U.S. PATENT DOCUMENTS 5,044,006 A * 8/1991 Cyrulnik .................. G21K 1/00 378/65
5,596,186 A 1/1997 Kobayashi
7,859,350 B1 12/2010 Schwindt et al.
2014/0312449 A1 10/2014 Jonak-Auer et al.
2016/0276144 A1* 9/2016 Chaudhary ......... H01J 49/0054
2017/0005124 A1* 1/2017 Elkhatib ............. H10F 39/8027
2021/0151613 A1* 5/2021 Yang .................. H10F 30/2255
2022/0406835 A1 12/2022 Uehira

OTHER PUBLICATIONS

Bruzewicz, Colin D., et al., "Trapped-Ion Quantum Computing: Progress and Challenges", Applied Physics Reviews 6, 021314 (2019); https://doi.org/10.1063/1.5088164, Apr. 9, 2019, 1-56.
Day, Matthew L., "Microfabricated optics for quantum control of trapped ions", Department of Physics, University of Bristol, Sep. 2018, pp. 1-215.

(Continued)

*Primary Examiner* — Georgia Y Epps
*Assistant Examiner* — Don J Williams
(74) *Attorney, Agent, or Firm* — Murphy, Bilak & Homiller, PLLC

(57) ABSTRACT

A device for controlling trapped ions includes a semiconductor substrate. The semiconductor substrate includes a plurality of optical detectors. A dielectric layer is disposed over the semiconductor substrate. The dielectric layer includes one or a plurality of lenses. An electrode structure is disposed over the dielectric layer. The electrode structure includes electrodes of an ion trap configured to trap one or more ions in a space above the electrode structure.

20 Claims, 6 Drawing Sheets

(56) References Cited

OTHER PUBLICATIONS

Eltony, Amira M., et al., "Transparent ion trap with integrated photodetector", Center for Ultracold Atoms, Research Laboratory of Electronics and Department of Physics, Aug. 6, 2018, pp. 1-3.
Ma, Jiaju, et al., "A Photon-Counting 4Mpixel Stacked BSI Quanta Image Sensor with 0.3e—Read Noise and 100dB Single-Exposure Dynamic Range", 2021 Symposium on VLSI Circuits Digest of Technical Papers, 2021, pp. 1-2.
Reens, David, et al., "High-Fidelity Ion State Detection Using Trap-Integrated Avalanche Photodiodes", arXiv:2202.01715v1 [quant-ph], Feb. 3, 2022, pp. 1-7.
Setzer, W. J., et al., "Fluorescence Detection of a Trapped Ion with a Monolithically Integrated Single-Photon-Counting Avalanche Diode", efarXiv: 2105.01235v2, Jul. 7, 2021, pp. 1-6.
Todaro, S. L., et al., "State Readout of a Trapped Ion Qubit Using a Trap-Integrated Superconducting Photon Detector", Physical Review Letters, American Physical Society, vol. 126, 2021, pp. 1-15.
Ulku, Arin Can, et al., "A 512 x 512 SPAD Image Sensor With Integrated Gating for Widefield Flim", IEEE Journal of Selected Topics in Quantum Electronics, vol. 25, No. 1, Jan./Feb. 2019, 2019, pp. 6801212-6801212.

* cited by examiner

DEVICE FOR CONTROLLING TRAPPED IONS WITH OPTICAL DETECTORS AND LENSES

TECHNICAL FIELD

This disclosure relates generally to the field of ion traps, and in particular to ion traps for quantum information processing.

BACKGROUND

Trapped ions are used for quantum information processing in a variety of applications such as, e.g., quantum sensors, optical clocks or as qubits (quantum bits) in quantum computers. Ions can be trapped with long lifetimes in a scalable array by virtue of electromagnetic fields.

Ions can be trapped in an alternating electromagnetic field generated by an RF (radio frequency) voltage applied to surface electrodes of micro-fabricated ion traps. The more ions to be trapped per unit area of the micro-fabricated ion trap device, the smaller should be the structural width of the structured electrode layer forming the electrodes and often also the feed lines to the ion trap.

The ions may be addressed by lasers for cooling, state preparation, quantum state detection and other purposes (such as processing). More specifically, the quantum state of trapped ions can be read by directing a laser beam onto the ion and collecting photons emitted by the ions. Photodetectors may be used for detection of these photons.

Integrating photodetectors into the trap allows site-specific readout and scaling the system to larger numbers of ions. However, when placing photodetectors close to ions, it is more challenging to avoid the occurrence of detrimental effects such as stray charges accumulating on dielectric surfaces, changes in electrostatic potential seen by the ions or magnetic fields which may cause shifts in the qubit transitions. In addition, a high readout fidelity and a low dark count rate are desired.

SUMMARY

According to an aspect of the disclosure, a device for controlling trapped ions includes a semiconductor substrate. The semiconductor substrate includes a plurality of optical detectors. A dielectric layer is disposed over the semiconductor substrate. The dielectric layer includes one or a plurality of lenses. An electrode structure is disposed over the dielectric layer, wherein the electrode structure includes electrodes of an ion trap configured to trap one or more ions in a space above the electrode structure.

BRIEF DESCRIPTION OF THE DRAWINGS

The elements of the drawings are not necessarily to scale relative to each other. Like reference numerals designate corresponding similar parts. The features of the various illustrated examples can be combined unless they exclude each other and/or can be selectively omitted if not described to be necessarily required. Examples are depicted in the drawings and are exemplarily detailed in the description which follows.

DETAILED DESCRIPTION

As used in this specification, the terms “electrically connected” or “electrically coupled” or similar terms are not meant to mean that the elements are directly contacted together; intervening elements may be provided between the “electrically connected” or “electrically coupled” elements, respectively. However, in accordance with the disclosure, the above-mentioned and similar terms may, optionally, also have the specific meaning that the elements are directly contacted together, i.e. that no intervening elements are provided between the “electrically connected” or “electrically coupled” elements, respectively.

Further, the words "over" or "beneath" with regard to a part, element or material layer formed or located or arranged "over" or "beneath" a surface may be used herein to mean that the part, element or material layer be located (e.g. placed, formed, arranged, deposited, etc.) "directly on" or "directly under", e.g. in direct contact with, the implied surface. The word "over" or "beneath" used with regard to a part, element or material layer formed or located or arranged "over" or "beneath" a surface may, however, either be used herein to mean that the part, element or material layer be located (e.g. placed, formed, arranged, deposited, etc.) "indirectly on" or "indirectly under" the implied surface, with one or more additional parts, elements or layers being arranged between the implied surface and the part, element or material layer.

Generally, micro-fabrication techniques as used herein for ion trap device fabrication may, e.g., involve photolithography methods (e.g. including photoresist application, patterning, etching) and/or deposition techniques (e.g. chemical vapor deposition (CVD), physical vapor deposition (PVD), sputtering) and/or plating techniques (e.g. electroless plating, galvanic plating) for applying dielectric layers, metal layers and electrically conductive layers (which are, e.g., also metal layers). Further, micro-fabrication techniques for structuring may include etching processes for structuring photoresist layers, dielectric layers, electrode layers, metal layers and electrically conductive layers. Further, microfabrication of ion trap devices may involve wafer processing techniques and/or wafer bonding techniques.

Figure 1:
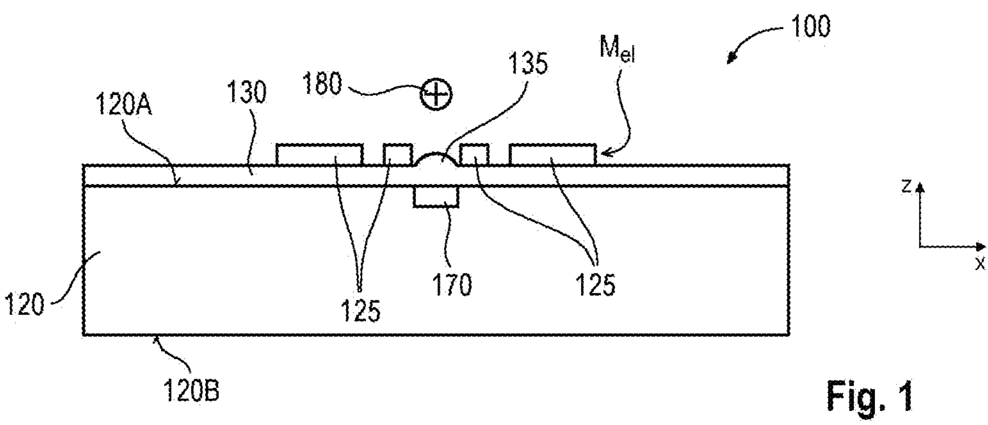
FIG. 1 is a schematic cross-sectional view of an exemplary device for controlling trapped ions.

Referring to FIG. 1, a device 100 for controlling trapped ions includes a semiconductor substrate 120. The semiconductor substrate 120 includes a plurality of optical detectors 170, of which only one is depicted in FIG. 1 for ease of illustration.

A dielectric layer 130 is disposed over the semiconductor substrate 120. The dielectric layer 130 includes one or a plurality of lenses 135.

An electrode structure is disposed over the dielectric layer 130. The electrode structure includes electrodes 125 of an ion trap configured to trap one or more ions 180 in a space above the electrode structure. The electrode(s) 125 may, e.g., be formed of a structured electrode layer Mei.

The device 100 contains at least one ion trap. The electrodes 125 are part of this ion trap and are configured to trap one or a plurality of ions 180 in a space above the electrodes 125 (only one ion 180 is shown in FIG. 1 for ease of illustration).

The ion trap device 100 (including the semiconductor substrate 120, the dielectric layer 130, the structured electrode layer $M_{el}$ and thus the electrodes 125 of the ion trap device 100) may be fabricated by micro-fabrication techniques. The semiconductor substrate 120 may be substantially planar. The Z-direction may represent the height dimension of the ion trap device 100. The X-direction and the Y-direction are perpendicular to each other and define a plane in the width and length direction of the ion trap device 100, which is normal to the Z-direction.

In the examples disclosed herein the structured electrode layer $M_{el}$ may, e.g., include RF electrodes 125 for RF trapping and DC electrodes 125 for static electric-field trapping. An ion trap disclosed herein can trap many ions 180 that may be individually addressable and movable by appropriately controlling the potentials of the electrodes 125 of the ion trap device 100.

The location of the ion 180 can be controlled by electrical voltage(s) applied to the electrode(s) 125 of the structured electrode layer $M_{el}$. For instance, the ion 180 can be moved in the space in one or more lateral directions (e.g., in the Y-direction (see FIG. 2) or, in general, in any direction lying in a plane which is normal to the Z-direction) by RF and DC (direct current) voltages separately coupled to specific electrodes 125.

The structured electrode layer $M_{el}$ may further include feedlines connected to the electrodes 125. Such feedlines, like any other structure of the structured electrode layer $M_{el}$, may also be referred to by reference numeral 125.

The structured electrode layer $M_{el}$ is an electrically conductive layer. It may include or be a metal layer, for example. That is, the structured electrode layer $M_{el}$ (and thus, the electrodes 125) may comprise or may be of an electrically conductive material such as Al, Cu, Au, or an AlSiCu alloy or an AlCu alloy, for example.

The semiconductor substrate 120 may, e.g., be a semiconductor wafer or a portion diced out of a semiconductor wafer (such as a chip). The semiconductor substrate 120 may, e.g., be a silicon (Si) substrate or a silicon carbide (SiC) substrate. In other examples, the semiconductor substrate 120 may, e.g., be a silicon-on-insulator (SOI) substrate.

The dielectric layer 130 may be disposed, e.g., over a first main surface 120A of the semiconductor substrate 120 and, e.g., beneath the structured electrode layer $M_{el}$. The semiconductor substrate 120 may further include a second main surface 120B opposite the first main surface 120A.

The dielectric layer 130 may, e.g., be of a silicon oxide or silicon nitride material. The dielectric layer 130 may be formed by micro-fabrication, e.g. by plasma-CVD (chemical vapor deposition) or, e.g., by thermal decomposition of tetraethyl orthosilicate (TEOS).

The quantum state of trapped ions 180 can be read by directing a laser beam (not shown) onto the ion(s) 180 and collecting photons that are emitted by the ion(s) 180 in reply to being excited by the laser beam. These photons are only emitted by the ion if the ion 180 is in a particular quantum state before being hit by the laser beam. Thus a distinction between states is possible by counting the emitted photons.

The lens 135 of the dielectric layer 130 may be located in a vertical direction over the optical detector 170. The lens 135 may be positioned such that photons emitted by the ion 180 are directed (focused) on the optical detector 170. This allows to reduce the area of the optical detector 170 (i.e., to make the integrated optical detector smaller) and to keep stray light away from the optical detector 170.

By reducing the size of the optical detector 170, electrical interference between the optical detector 170 and the ion 180 may be reduced. The optical detector 170 may be placed closer to the ion(s) 180, i.e., the thickness of the dielectric layer 130 may be reduced (compared to the case where no lens 135 is provided in the dielectric layer 130). By keeping more stray light away from the optical detector 170, the dark count rate may be reduced.

The optical detector 170 may be a single-photon detector. For example, the optical detector 170 may be a photodiode (PD) such as, e.g., a single-photon avalanche diode (SPAD) or a quanta image sensor (QIS). A QIS is a PD which allows to resolve single photons without avalanche gain. In other examples, a superconducting nanowire single-photon detector (SNSPD) may be used as the optical detector 170. SNSPDs provide high quantum efficiency and low dark counts.

In FIG. 1, the ion trap of the ion trap device 100 is exemplified to be designed as a so-called "surface-electrode" ion trap. In surface-electrode ion traps all electrodes (i.e., DC electrodes 125 and RF electrodes 125) may be contained substantially in a single plane. Such two-dimensional (2D) ion trap geometries provide for high scalability. As will be described further below, in other examples the ion trap device 100 may use three-dimensional (3D) ion trap geometry (as illustrated, for example, in FIGS. 10, 11).

Figure 2:
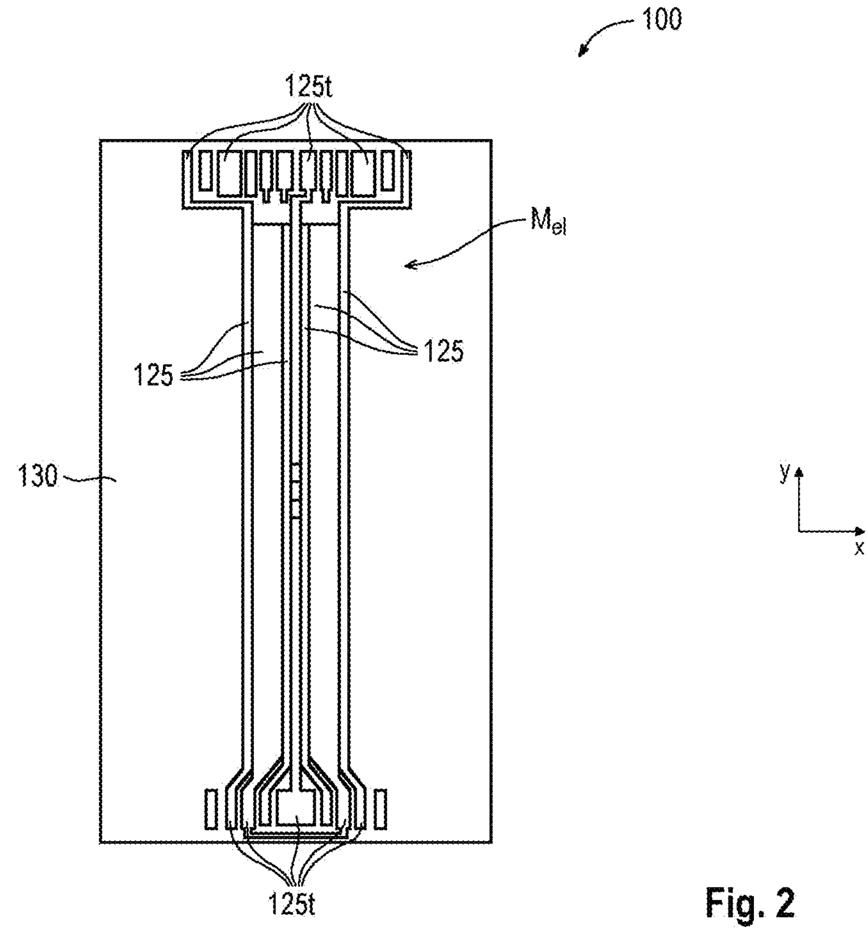
FIG. 2 is a top view of the exemplary device for controlling trapped ions shown in FIG. 1.

FIG. 2 is a schematic top view of an exemplary, simplified electrode structure formed in the structured electrode layer Mel of an ion trap device 100. Some of the electrodes 125 may be formed as stripe electrodes, while other electrodes 125 may be formed as insular electrodes of small lateral dimensions, for example. Many different electrode layouts are known in the art and could be used in the example ion trap devices 100 disclosed herein.

The ion trap device 100 may also be referred to as a micro-fabricated ion trap or an ion trap chip. The ion trap device 100 may have one or a plurality of trapping sites, i.e. may be configured to trap one ion 180 or, e.g., a chain of ions 180 oriented in the Y-direction, for example.

FIG. 2 further illustrates optional terminal lands 125*t* of the structured electrode layer Mel available for electrically connecting the micro-fabricated electrodes 125 via connectors (not shown, e.g., wire bonds) to external circuitry (not shown). Other designs of electrical connections of the electrical interconnect are also feasible. The electrodes 125 may, in other examples, not be connected to terminal lands 125*t* exposed at the insulator 130 but, e.g., to vias which may directly connect to an electrical interconnect (e.g., FIG. 8) and/or to integrated circuitry (not shown) in the semiconductor substrate 120, for example.

In the following, without loss of generality, the semiconductor substrate 120 is exemplified by a silicon substrate 120, e.g. by a silicon chip.

Figure 3:
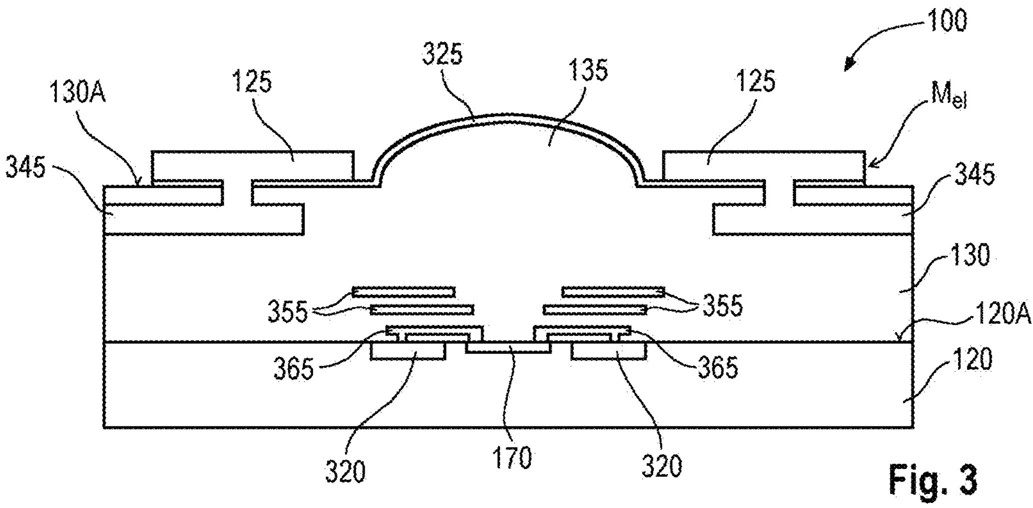
FIG. 3 is a schematic cross-sectional partial view of an exemplary device for controlling trapped ions having an optical detector disposed beneath a lens.

FIG. 3 illustrates a partial view of an ion trap device 100 as, e.g., shown in FIGS. 1 and 2. The lens 135 may, e.g., be formed of the dielectric layer 130. The lens 135 may be provided at an upper surface 130A of the dielectric layer 130. The lens 135 may, e.g., be formed by a convex protrusion of this upper surface 130A.

The lens 135 may, e.g., be placed between electrodes 125 of the ion trap device 100. For example, the electrodes 125 are disposed over the upper surface 130A of the dielectric layer 130.

In some examples, the lens 135 may be coated by a transparent electrically conductive material 325. The transparent electrically conductive material 325 may, e.g., be a conductive and transparent oxide, in particular indium tin oxide (ITO) or aluminum doped zinc oxide (Al:ZnO). In other examples, the electrically conductive transparent material 325 may be a metal (e.g., Au) having a thickness sufficiently small to be transparent for fluorescence light (emitted photons) from the ion 180. Further, the electrically conductive transparent material 325 may comprise or be of TiN or SiN:H or amorphous Si.

The electrically conductive transparent material 325 avoids electric charges from accumulating on the surface of the lens 135. To this end, the electrically conductive transparent material 325 may be connected to a DC potential or ground. In the example shown in FIG. 3, the electrically conductive transparent material 325 is, e.g., connected to one or more electrodes 125 of the ion trap device 100. This electrode 125 may, e.g., be a ground electrode or a DC electrode of the ion trap device 100.

In some examples, the electrically conductive transparent material 325 may itself act as an electrode of the ion trap device 100. Since the topography of the lens 135 is small compared to the ion-electrode distance, the electrode structure of the ion trap device 100 may, e.g., be composed of electrodes 125 formed of the structured electrode layer $M_{el}$ and/or of the electrically conductive transparent material 325 covering the surface of one or a plurality of lenses 135. For example, the lens 135 may have a height of about 5 μm (range: 2-10 μm, for example) from the upper surface 130A of the dielectric layer 130 while the ions 180 are located typically 80-200 μm above this upper surface 130A. The lateral dimension of the lens 135 may, e.g., be about 20 μm (range: 10-50 μm) in the specific example shown. In general, however, the lateral dimension of the lens 135 may vary over a much broader range, as will be described further below.

Further, the electrically conductive transparent material 325 may itself act as an electrode of the ion trap device 100. For example, as shown in FIG. 3, the electrically conductive transparent material 325 may short-circuit electrodes 125 formed by the structured electrode layer $M_{el}$. That way, a DC or ground electrode of the ion trap device 100 may be composed of a portion made of metal (if the structured electrode layer $M_{el}$ is a metal layer) and a portion made of the electrically conductive transparent material 325. Like that, the lens 135 with conductive transparent material 325 could serve as both, an electrode to trap and/or shuttle an ion 180 (above the lens 135) as well as to collect light from the ion 180 for read-out by optical detector 170.

If the electrically conductive transparent material 325 covering the lens 135 is used as an electrode of the ion trap device 100, the electrode topography (i.e. the elevation of the electrically conductive transparent material 325 in relation to the height of the electrodes 125 of the structured electrode layer $M_{el}$) may be compensated by adjusting the DC voltage applied to the electrodes 125.

Typical elevations might range from few percent to a few ten percent of the surface-ion distance, such that the electrode surface can still be approximated two-dimensionally by adding numerical correction terms. For example, elevations of up to 20 μm for surface-ion distances of 50 μm, or elevations of up to 40 μm for surface-ion distances of 100 μm are possible. Single ion traps can have higher lens elevations than traps for ion strings, where axial micromotion can occur and limit the achievable lens elevation.

FIG. 3 further illustrates additional metal layers which may be provided in the dielectric layer 130. For example, a lower structured metal layer 345 may be provided in the dielectric layer 130. The lower structured metal layer 345 may form an electrical interconnect configured to electrically connect to the electrodes 125 of the structured electrode layer $M_{el}$.

Further, the dielectric layer 130 may comprise one or a plurality of shielding layers 355 configured to block stray light from hitting the optical detector 170. The shielding layers may, e.g., comprise or be of metal. A metallic redistribution layer 365 provided in the dielectric layer 130 may, e.g., be used for electrically connecting the optical detector 170 to read-out circuitry 320. For example, the read-out circuitry may be integrated in the semiconductor substrate 120.

The integration of the optical detector 170 and, e.g., the read-out circuitry 320 in the semiconductor substrate may be carried out during front-end-of-line (FEOL) wafer processing. The integration of the shielding layers 355 and/or the electrical wiring layer 365 in the dielectric layer may be carried out during back-end-of-line (BEOL) wafer processing.

The shielding layers 355 and/or the electrical wiring layer 365 may extend in a vertical projection above the read-out circuitry 320. That way, the read-out circuitry 320 is shielded by, e.g., one or any of these structured layers 355, 365.

In other examples, the electrical connection between the optical detector 170 and the read-out circuitry 320 is fully implemented in the semiconductor substrate 120.

As will be described in more detail further below, the read-out circuitry 320 may merely represent a front-end circuitry portion of the read-out circuitry. The read-out circuitry 320 may be paced close to the optical detector 170 to avoid a long unbuffered signal path.

Figure 4A:
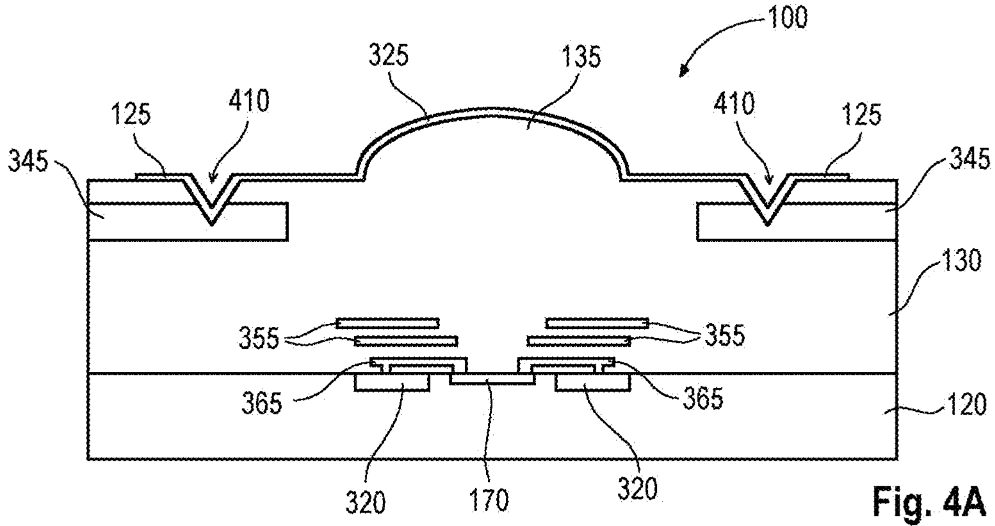
FIG. 4A is a schematic cross-sectional partial view of an exemplary device for controlling trapped ions having an optical detector disposed beneath a lens.
Figure 4B:
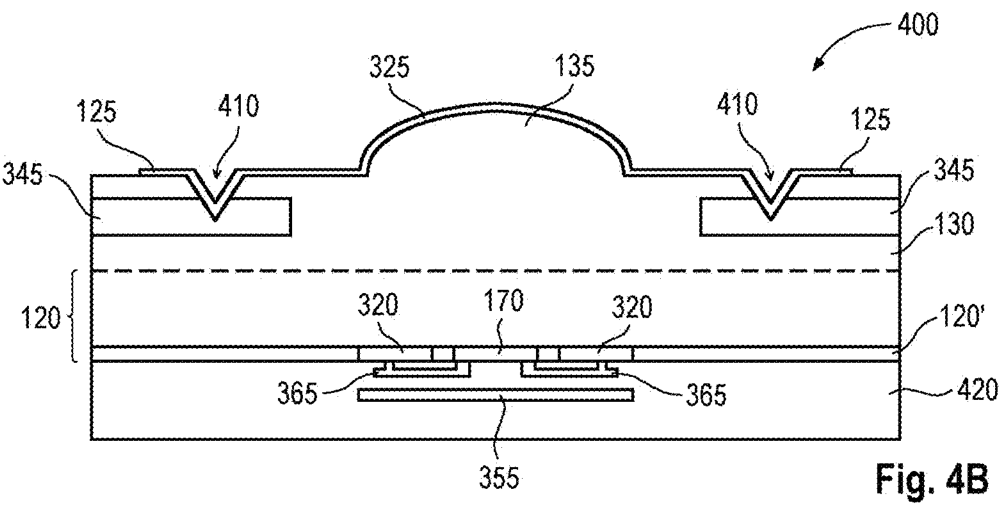
FIG. 4B is a schematic cross-sectional partial view of an exemplary device for controlling trapped ions having an optical detector disposed beneath a lens.

In the example of FIG. 3, the lens filling factor (i.e. the percentage of the area of the upper surface 130A of the dielectric layer 130 which is occupied by a lens 135) may be limited by the structured electrode layer $M_{el}$, i.e. by the electrodes 125 located around the lens 135. Referring to FIGS. 4A and 4B, the filling factor may be increased by omitting at least some of the electrodes 125 of the structured electrode layer $M_{el}$ and/or by replacing them by the electrically conductive transparent material 325. For example, some or all ground and/or DC electrodes of the ion trap device 100 may be replaced by ground and/or DC electrodes formed of the electrically conductive transparent material 325. FIGS. 4A and 4B illustrate examples in which the metal electrodes 125 of FIG. 3 are (partly or fully) replaced by electrodes 125 made of the electrically conductive transparent material 325.

The electrically conductive transparent material 325 may be electrically connected by the lower structured metal layer 345. For example, holes or trenches 410 may be provided in the dielectric layer 130 to allow the electrically conductive transparent material 325 to connect to the lower structured metal layer 345.

In some examples, all DC electrodes and/or all ground electrodes of the ion trap device 100 may be formed by the electrically conductive transparent material 325. That way, the filling factor may be substantially increased to equal to or greater than 80% or 90% or 95% or even nearly 100%. In other words, the upper surface 130A of the dielectric layer 130 may be configured as an array of lenses 135 with essentially no spacing between adjacent lenses 135. The electrically conductive transparent material 325 may be structured to form multiple ground and/or DC electrodes.

Figure 5:
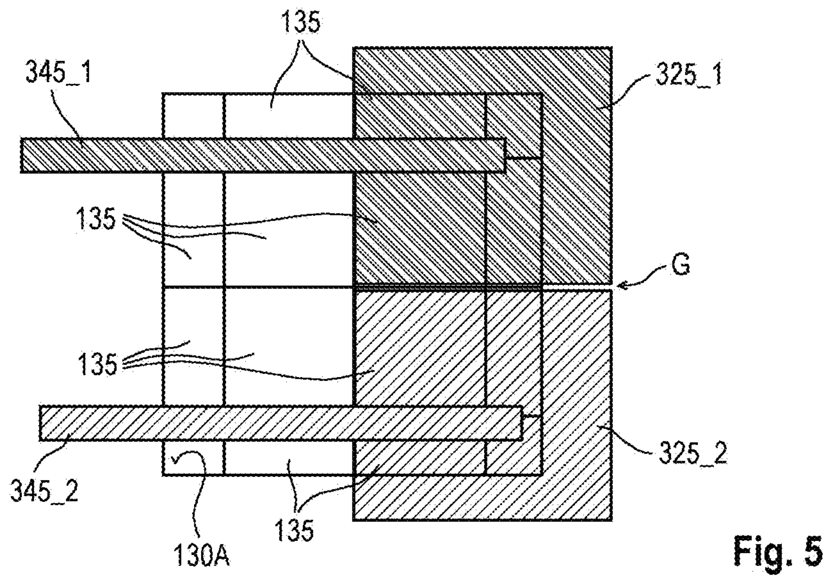
FIG. 5 is a partial top view of an example of the upper surface of the dielectric layer illustrating an array of lenses.

FIG. 5 illustrates a partial top view of an example of the upper surface 130A of the dielectric layer 130. As mentioned above, the upper surface 130A may be structured to form an array of lenses 135. For example, there is essentially no spacing between adjacent lenses 135 (corresponding to a high filling factor).

The electrically conductive transparent material 325 of one electrode is denoted by reference sign 325_1 while the electrically conductive transparent material 325 of another electrode is denoted by reference sign 3252. The electrodes formed by the electrically conductive transparent material 325_1 and 325_2 are spaced apart by a small gap G. Feedlines (formed by the lower structured metal layer 345, for example) connecting to these electrodes are denoted by reference signs 345_1 and 345_2, respectively.

The electrically conductive transparent material 325_1, 325_2 of individual electrodes may cover a plurality of lenses, e.g. 4 lenses. In general, each electrode may cover one or multiple lenses and/or may have one or multiple optical detectors below.

FIG. 4B illustrates a partial sectional view of an ion trap device 400 in which the optical detector 170 is implemented as a backside illuminated photodiode. In this configuration, a higher photodiode density can be achieved compared to the configuration of front-side illuminated photodiodes as, e.g., shown in FIGS. 3 and 4. The technique of backside illumination allows to arrange the electrical wiring layer behind the optical detector (photodiode) 170 by flipping the semiconductor substrate 120 (e.g., silicon wafer) during manufacturing and then thinning its backside so that light can hit the optical detector 170 without passing through the wiring layer 365. For example, the optical detector 170 may be implemented in a silicon layer 120' of a silicon-on-insulator (SOI) substrate 120. The electrical wiring 365 and, e.g., a shielding layer 355 are implemented in an oxide layer 420, for example.

As previously mentioned, the optical detector 170 may, e.g., include a photodiode (PD). For example, a SPAD may be used. SPADs operate in the avalanche regime. The pn-junction is stressed above its breakdown voltage and a single photon is enough to trigger an avalanche breakdown, thus generating a large signal in response. This large signal, however, may be disadvantageous for ion trap applications because voltage pulses will transfer momentum to the ion and degrade its motional coherence or even cause ion loss. Therefore, the active area of the PD may be kept small to limit the radiated energy during breakdown. This can be achieved by the lenses 135, as disclosed herein.

A quanta image sensor (QIS) is a PD to resolve single photons without avalanche gain. If a QIS is used, it is (also) beneficial to use a small active region for the PD to see a large voltage signal for every electron-hole pair. For example, the active area of the QIS-PD may be equal to or smaller than 0.3×0.3 μm or even 0.2×2 μm. That way a large voltage signal of about several hundreds of μV per electron-hole pair (i.e., per photon) can be obtained. Due to the proportional operation regime of a QIS, this PD radiates very little for every collected photon. Therefore, ion trap interference is less critical for QISs than for SPADs. However, the lens 135 may still improve the signal in this case.

FIGS. 6 to 10 illustrate several examples of ion trap devices. These examples can be combined, if not stated differently or if not excluded by technical constraints.

Figure 6:
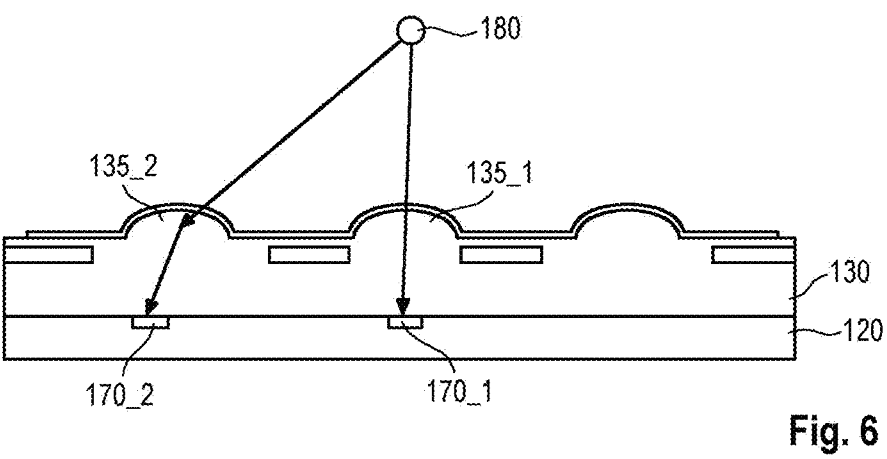
FIG. 6 is a schematic cross-sectional partial view of an exemplary device for controlling trapped ions having a plurality of lenses and optical detectors arranged such that a plurality of optical detectors can collect light emitted from the same ion.

Referring to FIG. 6, the semiconductor substrate 120 includes a first optical detector 170_1 and a second optical detector 170_2. The dielectric layer 130 comprises a first lens 135_1 and a second lens 135_2. The first optical detector 170_1 and the first optical lens 135_1 are arranged such that the first optical detector 170_1 can collect light emitted from the ion 180 and passed through the first lens 135_1. The second optical detector 170_2 and the second lens 135_2 are arranged such that the second optical detector 170_2 can collect light emitted from the same ion 180 and passed through the second lens 135_2. In other words, the array of lenses 135_1, 135_2, etc. increases the yield by allowing signal to be collected from a wider solid angle.

Figure 7:
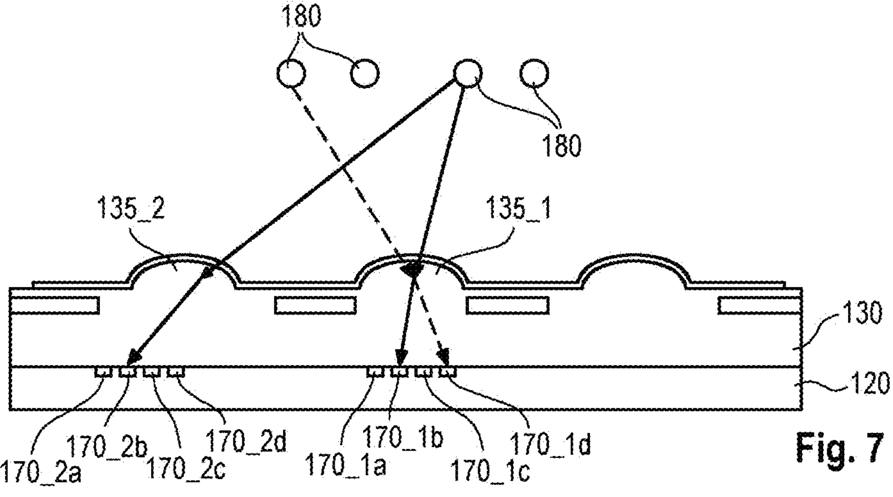
FIG. 7 is a schematic cross-sectional partial view of an exemplary device for controlling trapped ions having a plurality of lenses and optical detectors according to FIG. 7A and arranged such that at least two optical detectors can collect light emitted from different ions.

Referring to FIG. 7, a plurality of optical detectors **170_1*a*, 170_1*b*, 170_1*c*, 170_1*d* may be arranged under a specific (first) lens 135_1. Similarly, a plurality of second optical detectors 170_2*a*, 170_2*b*, 170_2*c*, 170_2*d* may be arranged under another specific (second) lens 135_2. In other words, the first and/or second optical detectors 170_1, 170_2 of FIG. 6 may each be split into a plurality of optical detectors 170_1*a-d* and 170_2*a-d*, respectively. All optical detectors 170_1*a-d* arranged below the first lens 1351 only receive light (from ions 180) that passed through the first lens 135_1, and the same applies to the optical detectors 170_2*a-d* and the second lens 135_2**.

Similar as in FIG. 6, a wide solid angle for light detection is obtained by the arrangement in FIG. 7. In addition, crosstalk from other ions can be better suppressed with the arrangement of FIG. 7 than with the arrangement of FIG. 6. This is due to the fact that the position of ions 180 can be better resolved by providing a plurality of optical detectors 170_1*a-d*, 170_2*a-d* per lens 135_1 and 135_2, respectively. More specifically, in the example shown, the optical detectors 170_1*b* and 170_2*b* only receive light from a single ion 180, while other ions do not illuminate these optical detectors (but, for example, optical detector 170_1*d* as illustrated).

In some examples, each optical detector 170_1*a-d* and/or 170_2*a-d* may correspond to a specific ion position. That way, ions 180 of an ion chain or an ion register may be individually detected by the arrangement of FIG. 7. Stated differently, the origin of a (single) photon can be distinguished.

The distance between neighboring ions 180 may vary over a wide range. In a common ion register—a so-called ion chain—the distance between neighboring ion positions 180 can, e.g., be between 2 to 6 μm or 3 to 5 μm. If the ions 180 are trapped at a greater distance without interaction, this distance can be much larger, for example between 30 μm and 100 μm.

The lateral size of a lens 135 may vary over a wide range. In many cases, small lenses of, e.g., about 10 μm×10 μm (range: 5 μm×5 μm to 50 μm×50 μm, for example) may be used. In other examples, medium size lenses of, e.g., about 100 μm×100 μm (range: 50 μm×50 μm to 500 μm×500 μm, for example) may be used. The size of medium lenses 135 approximately corresponds to the electrode sizes. In other examples, large lenses having lateral dimensions of, e.g., 1 mm×1 mm (range: 500 μm×500 μm to 3 mm×3 mm, for example) may be used.

Figure 8:
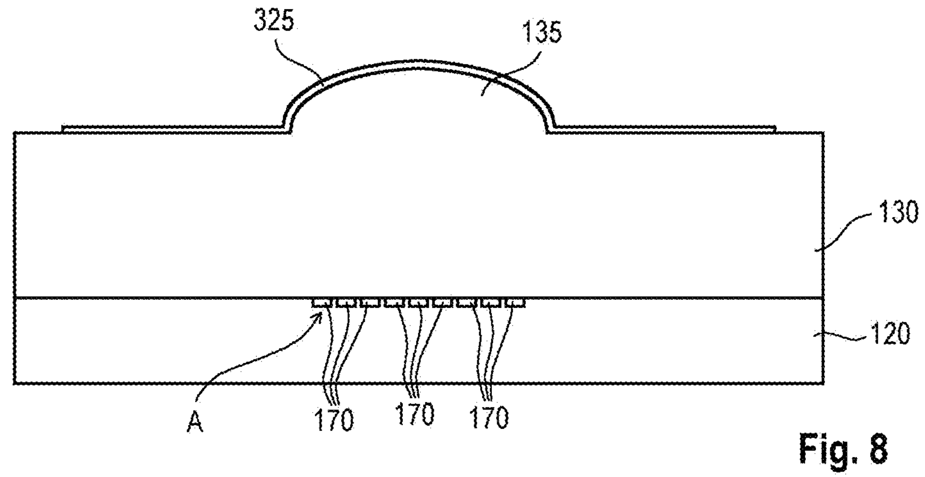
FIG. 8 is a schematic cross-sectional partial view of an exemplary device for controlling trapped ions having a plurality of optical detectors arranged beneath one large lens.

FIG. 8 illustrates a relatively large lens 135 disposed over an array A of optical detectors 170 (e.g., PDs). The lens 135 may, e.g., have a height of about 50 μm and/or lateral dimensions equal to or greater than, e.g., 100 μm×100 μm, 300 μm×300 μm, 500×500 μm or 1 mm×1 mm. A relatively large lens 135 allows implementing an optical detector array A with limited positional accuracy. Limited positional accuracy may be desirable for detecting the quantum states of ions 180 in ion chains or to detect ion micromotion laterally to the trap surface.

The lens 135 allows to project an "ion plane" (i.e., a plane in which a chain or a register of ions 180 is held) onto the array A of optical detectors 170. As mentioned before, backside illuminated PDs (see FIG. 4B) may improve the PD density in the array A.

Figure 9:
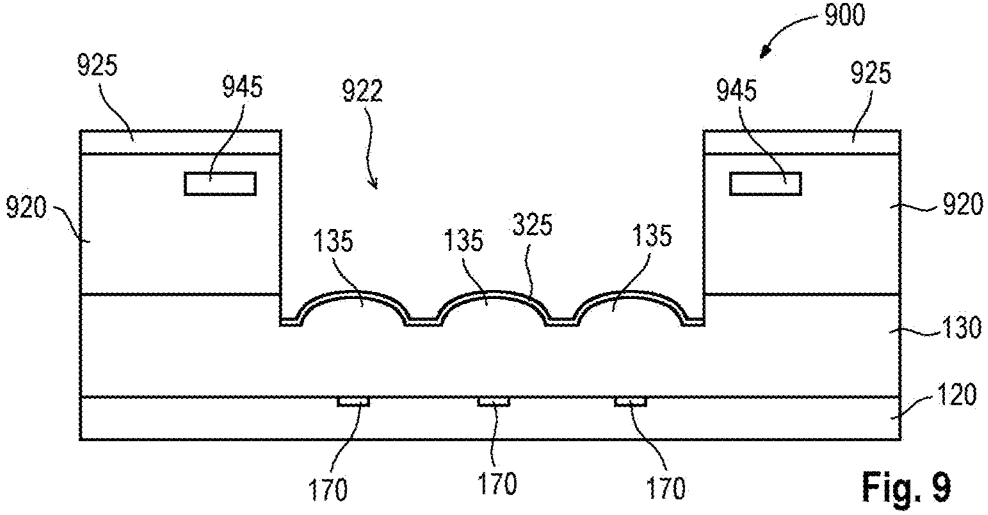
FIG. 9 is a schematic cross-sectional partial view illustrating an example of integrating of a plurality of lenses in a device for controlling trapped ions.
Figure 10:
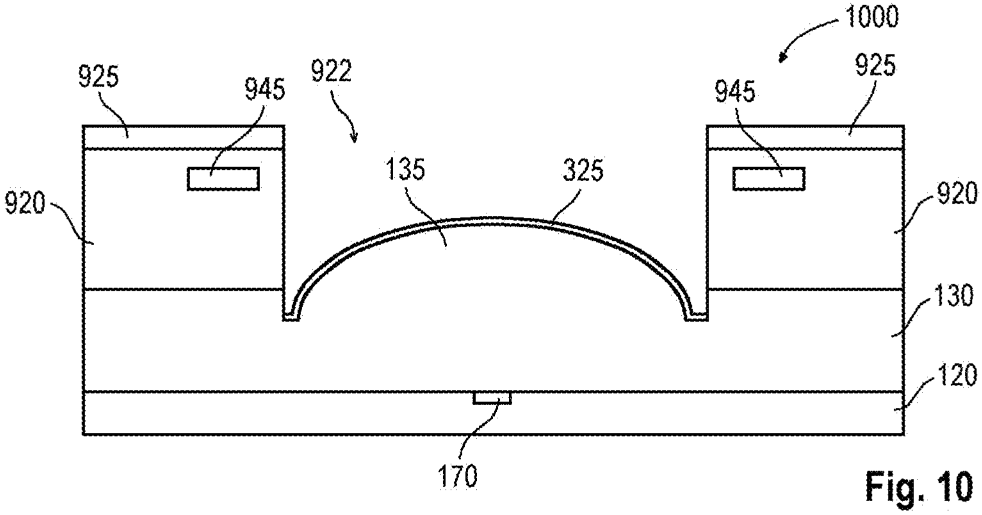
FIG. 10 is a schematic cross-sectional partial view illustrating an example of integrating a single lens in a device for controlling trapped ions.
Figure 11:
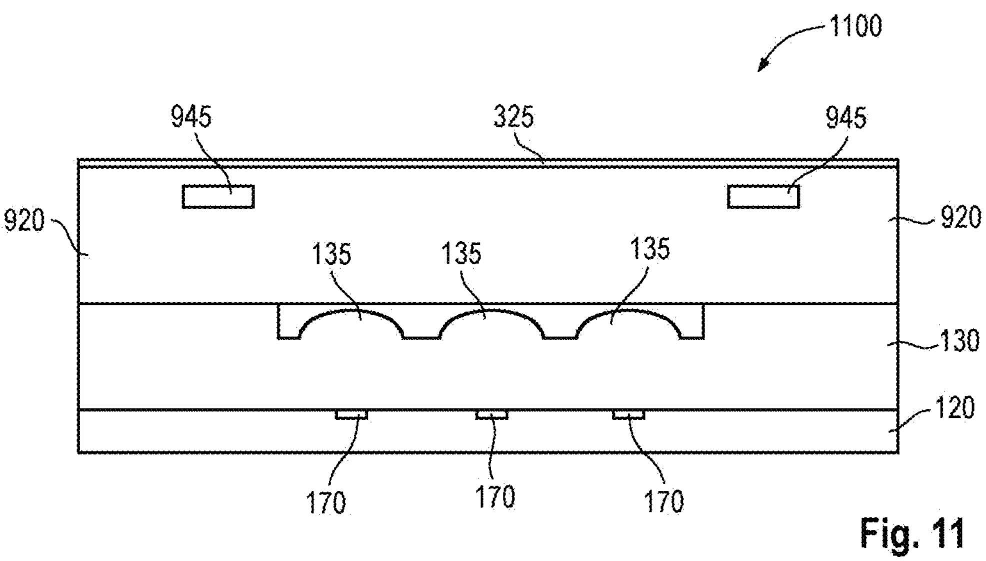
FIG. 11 is a schematic cross-sectional partial view illustrating an example of integrating one or a plurality of lenses formed in a transparent trap substrate in a device for controlling trapped ions.

FIGS. 9 to 11 show 2D ion trap devices 900, 1000, 1100. The ion trap devices 900, 1000, 1100 include a first trap substrate 920. The first trap substrate 920 is disposed over the dielectric layer 130. For example, wafer bond techniques may be used to bond the first trap substrate 920 to the dielectric layer 130 of the ion trap device 900, 1000, 1100.

At least a part of the electrode structure of the ion trap device 900, 1000, 1100 may be formed by a structured metal layer 925 provided on the first trap substrate 920, for example. The structured metal layer 925 corresponds to the electrodes 125 formed, e.g., in the electrode layer Mei.

The provision of the first trap substrate 920 may help to separate requirements for optical detectors 170 and lenses 135 (provided by the substrate (wafer) 120 with insulating layer 130) and for the ion trap (provided by the trap substrate 920). These substrates 120, 130 and 920 may be fabricated with different processes. Specifically, the fabrication of the lenses 135 may be carried out independently from the fabrication of the electrodes of the ion trap devices 900, 1000, 1100.

Referring to FIGS. 9 and 10, the first trap substrate 920 may include an opening 922. The opening 922 exposes one or a plurality of lenses 135. The arrangement shown in FIGS. 9 and 10 may be particularly advantageous when small or medium sized lenses 135 are used.

Referring to the description above to avoid reiteration, a least one optical detector 170 (and possible an array A of optical detectors 170) is arranged under each lens 135. The lenses 135 may, e.g., be coated with an electrically conductive transparent material 325 to avoid exposing dielectric surfaces to the ion(s) 180.

In addition to the structured metal layer 925, serving as trap electrodes, the first trap substrate 920 may further include lower metal layer(s) 945. These one or more lower metal layers 945 may serve as electrode wiring layers or shielding layers, for example. In some examples, the dielectric layer 130 may be void of any metal structures or layers.

The first trap substrate 920 may, e.g., be of a dielectric material or a semiconductor material. For example, the first trap substrate 920 may comprise or be of glass, sapphire, silicon, etc. In particular, it may be made of a different material than the dielectric layer 130, for example.

Referring to FIG. 11, instead of the opening 922, the first trap substrate 920 may be transparent for light emitted from one or more ions of the ion trap device 1100. The electrodes of the ion trap device 1100 may be formed (e.g., structured) of the electrically conductive transparent material 325. In this case, light from the ion(s) may optionally pass through an electrode (if structured from the electrically conductive transparent material 325), through the transparent first trap substrate 920 and through the lens(es) 135 to reach an optical detector 170.

Figure 12:
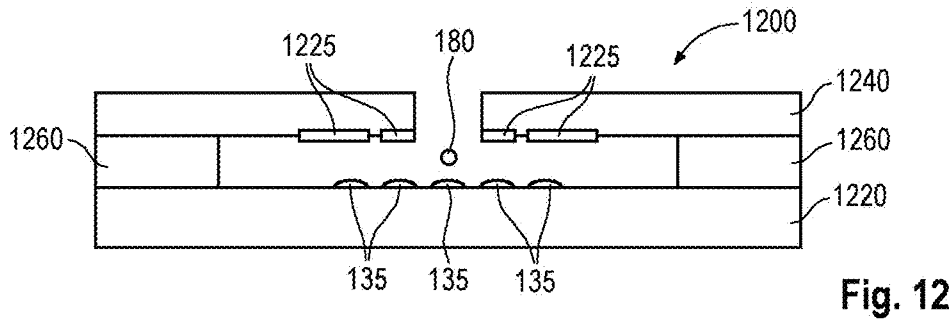
FIG. 12 is a schematic cross-sectional view of an exemplary three-dimensional (3D) device for controlling trapped ions integrating one or a plurality of lenses.
Figure 13:
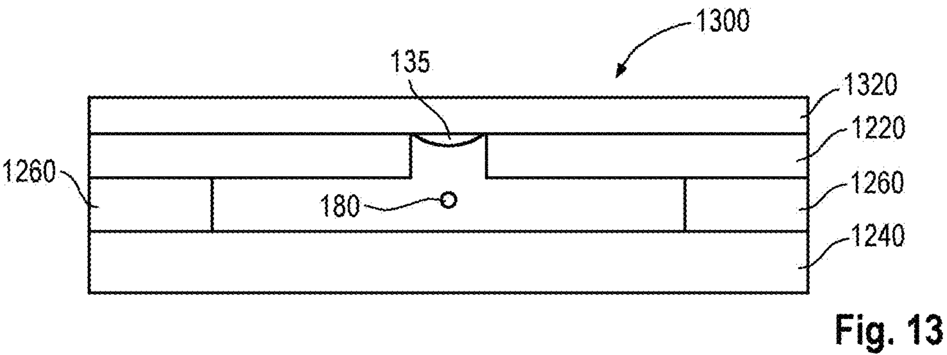
FIG. 13 is a schematic cross-sectional view of an exemplary three-dimensional (3D) device for controlling trapped ions illustrating a concept of disposing the one or a plurality of lenses above the space in which one or more ions are trapped.

FIGS. 12 and 13 illustrate exemplary three-dimensional (3D) ion trap devices 1200, 1300. Three-dimensional ion trap geometries such as, e.g., linear Paul traps distinguish over the surface-electrode trap geometries (see FIGS. 1 to 11, for example) by allowing substantially higher potential depth and higher trap frequencies.

The exemplary ion trap device 1200 includes a trap base structure 1220, a second trap substrate 1240 and spacers 1260 disposed between the trap base structure 1220 and the second trap substrate 1240. The ion(s) 180 are trapped between the trap base structure 1220 and the second trap substrate 1240.

The trap base structure 1220 may be constructed in accordance with any of the possibilities described above. It may, e.g., include the semiconductor substrate 120, the dielectric layer 130 and the electrode structure having electrodes 125 disposed over the dielectric layer 130 (not shown in FIG. 12). Further, the trap base structure 1220 may be arranged in accordance with the 3D implementations described in conjunction with FIGS. 9 to 11, thus including the first trap substrate 920. For ease of illustration, FIG. 12 merely illustrates the lenses 135 included by the trap base structure 1220.

A structured top electrode layer including electrodes 1225 may be disposed at a main (bottom) side of the second trap substrate 1240. The structured top electrode layer forms electrodes 1225 of the 3D ion trap device 1200. The ion trap device 1200 is configured to trap ion(s) 180 in the space between the trap base structure 1220 and the structured top electrode layer including electrodes 1225.

The structured top electrode layer may also be formed by micro-fabrication techniques. The second trap substrate 1240 may, e.g., be made of materials as mentioned before with respect to the first trap substrate 920.

In 3D ion trap device 1200 the DC-electrodes may be separated from the RF-electrodes by providing the DC-electrodes (not shown) on the trap base structure 1220, while providing the RF-electrodes as electrodes 1225 on the second trap substrate 1240. In particular, all RF-electrodes of the ion trap device 1200 may be provided on the second trap substrate 1240.

As described above, at least a part or all of the DC-electrodes (not shown) may be made of dielectrically conductive transparent material 325 which may, e.g., coat the lenses 135. The lenses 135 may be arranged in accordance with any of the possibilities described above, and in particular, in the form of an array A.

FIG. 13 illustrates a 3D ion trap device 1300. In FIG. 13 the trap base structure 1220 is placed on top of the device, while the second trap substrate 1240 (without opening) is used as a bottom of the ion trap device 1300. A read-out substrate 1320 containing read-out electronics coupled to the detectors in the trap base substrate 1220 may be placed on top of the ion trap device 1300.

Figure 14:
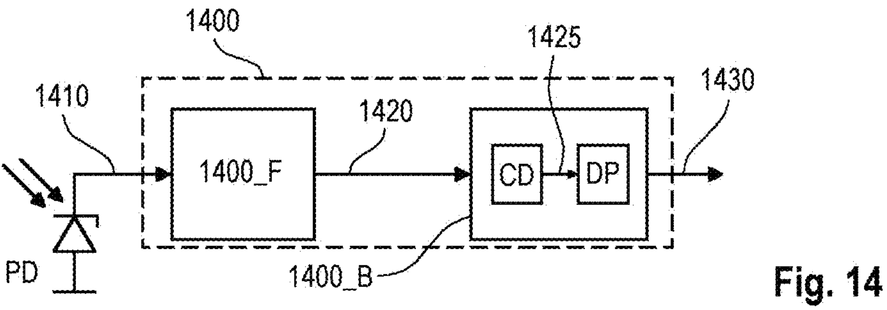
FIG. 14 is an exemplary block diagram of a read-out circuitry coupled to an optical detector.

FIG. 14 illustrates a block diagram of an example of a read-out circuitry 1400 coupled to an optical detector 170, e.g. a photodiode PD. The photodiode PD outputs a photo-signal 1410. The read-out circuitry 1400 includes a front-end circuitry portion 1400_F and a back-end circuitry portion 1400_B. The front-end circuitry portion 1400_F may receive the photo-signal 1410. The front-end circuitry portion 1400_F may be configured to convert the photo-signal 1410 to a first electrical signal 1420. The back-end circuitry portion 1400_B may receive the first electrical signal 1420. The back-end circuitry portion 1400_B may be configured to output a second electrical signal 1430 representing a count of photons collected by the photodiode PD.

The front-end circuitry portion 1400_F may, e.g., be implemented in the semiconductor substrate 120. For example, the front-end circuitry portion 1400_F may correspond to the read-out circuitry 320. That is, the front-end circuitry portion 1400_F may be located close to the photodiode PD to reduce parasitic inductance and capacitance.

The front-end circuitry portion 1400_F may implement a photon-counting function. The first electrical signal 1420 may be a signal which is proportional to the photon count.

The first electrical signal 1420 may be an analog signal. For example, the first electrical signal may be a voltage which is proportional to the number of collected photons. In addition, the front-end circuitry portion 1400_F may be an analog circuitry portion.

The back-end circuitry portion 1400_B may include a conversion device CD. The conversion device CD may have an analog input and a digital output. In particular, the conversion device may comprise an analog-to-digital converter (ADC), a time-to-digital converter (TDC) or a comparator (Comp).

An input of the conversion device CD may be coupled to the output of the front-end circuitry portion 1400_F. In particular, the input of the conversion device CD may receive the first electrical signal 1420. The conversion device CD may convert the first electrical signal 1420 into a digital electrical signal 1425.

The back-end circuitry portion 1400_B may further include a digital circuitry part DP. The conversion device CD may be coupled between the front-end circuitry portion 1400_F and the digital circuitry part DP of the back-end circuitry portion 1400_B. The digital circuitry part DP may be configured to output the second electrical signal 1430.

The first electrical signal 1420 (which may be an analog signal, e.g. an analog voltage signal) may be used as a "transport signal" for the photon count. That is, the conversion device CD, which may be used to digitize the photon count, may be located remote from the photodiode PD. By means of placing the back-end circuitry portion 1400_B (including, e.g., the conversion device CD and/or digital circuitry part DP) far away from the photodiode PD and thus from the ion 180, electromagnetic interference caused by the back-end circuitry portion 1400_B is small.

Stated differently, trapped ions 180 are sensitive to changes in electrostatic potential. Especially electrostatic kicks will increase the motional state of the ion 180, degrading the fidelity of gate operations and possibly leading to a complete ion loss. By placing the back-end circuitry portion 1400_B sufficiently far away from the ion(s) 180, this unwanted effect is strongly reduced in particular for SPADs, where high voltage kicks occur as a result of avalanche operation.

In other words, the photon-counting function may be implemented with analog signals in the front-end circuitry portion 1400_F to avoid digital (high-frequency) noise, which causes ion interference. An analog signal (first electrical signal 1420) may be used for long-distance photon count transport. Digitization and, e.g., evaluation of the digitized photon count (e.g., digital electrical signal 1425) may be carried out remote from the ion 180 by the back-end circuitry portion 1400_B.

The supply currents to the detector-local electronics (e.g., front-end circuitry portion 1400_F, read-out circuitry 320) may be transported in metallization striplines to avoid radiating magnetic fields.

Possible implementations of the front-end circuitry portion 1400_F may depend on the type of the photodiode PD used.

Figure 15A:
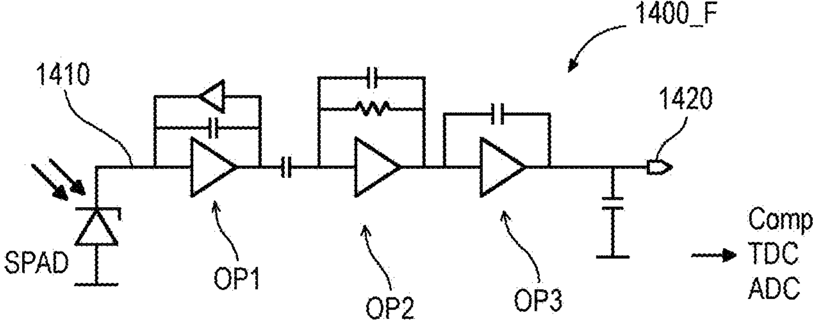
FIG. 15A is an exemplary schematics of a front-end circuitry portion of a read-out circuitry, the front-end circuitry portion being configured for a photodiode using the avalanche operation.

FIG. 15A illustrates an exemplary schematics of a front-end circuitry portion 1400_F for use with a SPAD. The front-end circuitry portion 1400_F may include a first operational amplifier OP1, a second operational amplifier OP2 and a third operational amplifier OP3, for example. The first operational amplifier OP1 may be used for pulse detection and reset. The resets can be relatively slow compared to the photon-counting and may be signalled by slowly pulling the signal line to a lower potential.

The second operational amplifier OP2 (optional) may be used for pulse extension.

The third operational amplifier OP3 may be used for integration, i.e. to produce a voltage signal indicative of the photon count.

Figure 15B:
FIG. 15B is an exemplary schematics of a front-end circuitry portion of a read-out circuitry, the front-end circuitry portion being configured for a photodiode using proportional operation.

FIG. 15B illustrates an exemplary schematics of a front-end circuitry portion 1400_F when a proportional photodiode PD (e.g., QIS) is used. In this case, the front-end circuitry portion 1400_F may include a gain amplifier AMP for generating the first electrical signal 1420 (analog photon count).

The back-end circuitry portion 1400_B may, e.g., be implemented on a separate substrate (e.g., on a read-out substrate 1320 as illustrated in FIG. 13). In other words, in some examples the semiconductor substrate 120 may not implement the back-end circuitry portion 1400_B. In other examples, the back-end circuitry portions 1400_B may be implemented in the semiconductor substrate 120, however, in a zone of the substrate which is outside of the area over which the array A of the lenses 135 is located and/or which is outside of the area in which the photodiodes PD are located.

In all examples, the lenses 135 allow to collect photons over a wide area (wide solid angle), thus increasing the photon count while still allowing to use a comparable small detector area. This concept increases the sensitivity of the optical detectors 170 and reduces interference of the ions 180 by the optical detectors 170 and/or the read-out circuitry 320.

The disclosure of this application, and, e.g., in particular the disclosure related to the read-out circuitry 1400 (FIGS. 14, 15A, 15B), is intended to also cover ion trap devices which do not necessarily use one or multiple lenses 135 (or an array A of lenses 135) for guiding the light emitted by the ion(s) to the optical detector(s) 170 (see below: FURTHER EXAMPLES). In these cases the insulating layer 130 may, e.g., be planar.

The following examples pertain to further aspects of the disclosure:

Example 1 is a device for controlling trapped ions. The device comprises a semiconductor substrate comprising a plurality of optical detectors; a dielectric layer disposed over the semiconductor substrate, wherein the dielectric layer comprises one or a plurality of lenses; and an electrode structure disposed over the dielectric layer, wherein the electrode structure comprises electrodes of an ion trap configured to trap one or more ions in a space above the electrode structure.

In Example 2, the subject matter of Example 1 can optionally include wherein at least a part of the electrode structure is formed by an electrically conductive transparent material coating the one or plurality of lenses.

In Example 3, the subject matter of Example 1 or 2 can optionally include wherein the semiconductor substrate comprises a first optical detector and a second optical detector; the dielectric layer comprises a first lens and a second lens; the first optical detector and the first optical lens are arranged such that the first optical detector can collect light emitted from an ion and passed through the first lens; and the second optical detector and the second optical lens are arranged such that the second optical detector can collect light emitted from the same ion and passed through the second lens.

In Example 4, the subject matter of any of the preceding Examples can optionally include wherein the semiconductor substrate comprises a first optical detector and a second optical detector; the dielectric layer comprises at least one lens; the first optical detector is arranged such that it can collect light emitted from a first ion and passed through the at least one lens; and the second optical detector is arranged such that it can collect light emitted from a second ion and passed through the at least one lens.

In Example 5, the subject matter of any of the preceding Examples can optionally further include a first trap substrate disposed over the dielectric layer, wherein at least a part of the electrode structure is formed by a structured metal layer provided on the first trap substrate.

In Example 6, the subject matter of Example 5 can optionally include wherein the first trap substrate comprises an opening exposing one or a plurality of lenses formed in the dielectric layer.

In Example 7, the subject matter of Example 5 or 6 can optionally include wherein the first trap substrate is transparent for light emitted from one or more ions of the ion trap.

In Example 8, the subject matter of any of the preceding Examples can optionally further include a second trap substrate disposed over the semiconductor substrate, wherein the space in which the one or more ions are trapped is between the semiconductor substrate and the second trap substrate.

In Example 9, the subject matter of any of the preceding Examples can optionally include wherein the optical detector comprises a photodiode, in particular a photodiode configured for avalanche operation or a photodiode configured for proportional operation.

In Example 10, the subject matter of Example 9 can optionally include wherein the photodiode is a front-side illuminated photodiode.

In Example 11, the subject matter of Example 9 can optionally include wherein the photodiode is a backside illuminated photodiode.

In Example 12, the subject matter of Example 11 can optionally include wherein the semiconductor substrate is a silicon-on-isolator, SOI, substrate.

In Example 13, the subject matter of any of Examples 9 to 12 can optionally further include wherein a read-out circuitry coupled to the photodiode which outputs a photo-signal, the read-out circuitry comprising a front-end circuitry portion and a back-end circuitry portion, wherein the front-end circuitry portion is configured to convert the photo-signal to a first electrical signal, and the back-end circuitry portion is configured to output a second electrical signal representing a count of photons collected by the photodiode.

In Example 14, the subject matter of Example 13 can optionally include wherein the front-end circuitry portion is implemented in the semiconductor substrate.

In Example 15, the subject matter of Example 13 or 14 can optionally further include wherein the back-end circuitry portion comprises a conversion device having an analog input and a digital output, in particular an analog-to-digital converter or a time-to-digital converter or a comparator, wherein the conversion device is electrically coupled between the front-end circuitry portion and a digital circuitry part of the back-end circuitry portion, and the conversion device is located remote from the photodiode.

The following examples pertain to further aspects of the disclosure where not necessarily lenses are used:

Example 16 is a device for controlling trapped ions. The device comprises a semiconductor substrate comprising a plurality of optical detectors; a dielectric layer disposed over the semiconductor substrate; and an electrode structure disposed over the dielectric layer, wherein the electrode structure comprises electrodes of an ion trap configured to trap one or more ions in a space above the electrode structure. The device may further in include wherein a read-out circuitry coupled to the optical detector which outputs a photo-signal, the read-out circuitry comprising a front-end circuitry portion and a back-end circuitry portion, wherein the front-end circuitry portion is configured to convert the photo-signal to a first electrical signal, and the back-end circuitry portion is configured to output a second electrical signal representing a count of photons collected by the optical detector.

In Example 17, the subject matter of Example 16 can optionally include wherein the front-end circuitry portion is implemented in the semiconductor substrate.

In Example 18, the subject matter of Example 16 or 17 can optionally further include wherein the back-end circuitry portion comprises a conversion device having an analog input and a digital output, in particular an analog-to-digital converter or a time-to-digital converter or a comparator, wherein the conversion device is electrically coupled between the front-end circuitry portion and a digital circuitry part of the back-end circuitry portion, and the conversion device is located remote from the optical detector.

Although specific examples have been illustrated and described herein, it will be appreciated by those of ordinary skill in the art that a variety of alternate and/or equivalent implementations may be substituted for the specific examples shown and described without departing from the scope of the present invention. This application is intended to cover any adaptations or variations of the specific examples discussed herein. Therefore, it is intended that this invention be limited only by the claims and the equivalents thereof.

What is claimed is:

1. A device for controlling trapped ions, the device comprising:

a semiconductor substrate comprising a plurality of optical detectors;

a dielectric layer disposed over the semiconductor substrate, wherein the dielectric layer comprises one or a plurality of lenses; and an electrode structure disposed over the dielectric layer, wherein the electrode structure comprises electrodes of an ion trap configured to trap one or more ions in a space above the electrode structure.

2. The device of claim 1, wherein at least a part of the electrode structure is formed by an electrically conductive transparent material coating the one or plurality of lenses.

3. The device of claim 1, wherein:

the semiconductor substrate comprises a first optical detector and a second optical detector;

the dielectric layer comprises a first lens and a second lens;

the first optical detector and the first optical lens are arranged such that the first optical detector can collect light emitted from an ion passed through the first lens; and the second optical detector and the second optical lens are arranged such that the second optical detector can collect light emitted from the same ion passed through the second lens.

4. The device of claim 1, wherein:

the semiconductor substrate comprises a first optical detector and a second optical detector;

the dielectric layer comprises at least one lens;

the first optical detector is arranged to collect light emitted from a first ion passed through the at least one lens; and the second optical detector is arranged to collect light emitted from a second ion passed through the at least one lens.

5. The device of claim 1, further comprising:

a trap substrate disposed over the dielectric layer, wherein at least a part of the electrode structure is formed by a structured metal layer provided on the trap substrate.

6. The device of claim 5, wherein the trap substrate comprises an opening exposing at least one lens formed in the dielectric layer.

7. The device of claim 5, wherein the trap substrate is transparent for light emitted from one or more ions of the ion trap.

8. The device of claim 1, further comprising:

a trap substrate disposed over the semiconductor substrate, wherein the space in which the one or more ions are trapped is between the semiconductor substrate and the trap substrate.

9. The device of claim 1, wherein the optical detector comprises a photodiode.

10. The device of claim 9, wherein the photodiode is a backside illuminated photodiode.

11. The device of claim 10, wherein the semiconductor substrate is a silicon-on-isolator substrate.

12. The device of claim 9, further comprising:

a read-out circuitry coupled to the photodiode which outputs a photo-signal, the read-out circuitry comprising a front-end circuitry portion and a back-end circuitry portion, wherein the front-end circuitry portion is configured to convert the photo-signal to a first electrical signal, and wherein the back-end circuitry portion is configured to output a second electrical signal representing a count of photons collected by the photodiode.

13. The device of claim 12, wherein the front-end circuitry portion is implemented in the semiconductor substrate.

14. The device of claim 12, wherein the back-end circuitry portion comprises:

a conversion device having an analog input and a digital output, wherein the conversion device is electrically coupled between the front-end circuitry portion and a digital circuitry part of the back-end circuitry portion, and wherein the conversion device is located remote from the photodiode.

15. The device of claim 14, wherein the conversion device is an analog-to-digital converter.

16. The device of claim 14, wherein the conversion device is a time-to-digital converter.

17. The device of claim 14, wherein the conversion device is a comparator.

18. The device of claim 9, wherein the photodiode is configured for avalanche operation.

19. The device of claim 9, wherein the photodiode is configured for proportional operation.

20. The device of claim 9, wherein the photodiode is a front-side illuminated photodiode.

* * * * *